United States Patent
Rasanen

(10) Patent No.: US 9,538,576 B2
(45) Date of Patent: Jan. 3, 2017

(54) METHOD, APPARATUS AND SYSTEM FOR DECIDING ON A CONTROL ENTITY FOR A PACKET DATA CONNECTION

(75) Inventor: Juha Antero Rasanen, Espoo (FI)

(73) Assignee: NOKIA SOLUTIONS AND NETWORKS, Espoo (FI)

(*) Notice: Subject to any disclaimer, the term of this patent is extended or adjusted under 35 U.S.C. 154(b) by 0 days.

(21) Appl. No.: 13/884,001

(22) PCT Filed: Nov. 8, 2010

(86) PCT No.: PCT/EP2010/067033
§ 371 (c)(1),
(2), (4) Date: May 8, 2013

(87) PCT Pub. No.: WO2012/062351
PCT Pub. Date: May 18, 2012

(65) Prior Publication Data
US 2013/0229986 A1    Sep. 5, 2013

(51) Int. Cl.
*H04W 80/00*    (2009.01)
*H04L 12/14*    (2006.01)
*H04W 4/24*    (2009.01)
*H04W 80/04*    (2009.01)
*H04W 84/04*    (2009.01)

(52) U.S. Cl.
CPC .............. *H04W 80/00* (2013.01); *H04L 12/14* (2013.01); *H04L 12/1403* (2013.01); *H04W 4/24* (2013.01); *H04W 80/04* (2013.01); *H04W 84/045* (2013.01)

(58) Field of Classification Search
USPC .......................................... 370/252, 310–350
See application file for complete search history.

(56) References Cited

U.S. PATENT DOCUMENTS

| | | | |
|---|---|---|---|
| 6,978,128 B1* | 12/2005 | Raman et al. ............. | 455/414.1 |
| 8,086,216 B2* | 12/2011 | Feder ...................... | H04L 12/14 |
| | | | 455/405 |
| 8,128,459 B2* | 3/2012 | Ling .................... | B24B 19/226 |
| | | | 451/11 |
| 2006/0136722 A1* | 6/2006 | Ogura et al. .................. | 713/168 |
| 2007/0249339 A1* | 10/2007 | Tamura ............... | H04L 12/5695 |
| | | | 455/433 |
| 2009/0040964 A1* | 2/2009 | Zhao et al. .................... | 370/328 |
| 2009/0199268 A1 | 8/2009 | Ahmavaara et al. | |

(Continued)

FOREIGN PATENT DOCUMENTS

WO    WO 2010/055402 A1    5/2010

OTHER PUBLICATIONS

International Search Report and Written Opinion dated Jul. 14, 2011 corresponding to International Patent Application No. PCT/EP2010/067033.

(Continued)

*Primary Examiner* — Warner Wong
(74) *Attorney, Agent, or Firm* — Squire Patton Boggs (US) LLP

(57) ABSTRACT

The invention relates to an apparatus, a system, a method and a computer program product for receiving a protocol identifier indicating a protocol used in a packet data connection of a user, determining if the user is roaming, and deciding on a control entity to be involved for controlling the packet data connection, depending on the protocol identifier and result of the determination if the user is roaming.

15 Claims, 6 Drawing Sheets

(56) References Cited

U.S. PATENT DOCUMENTS

| | | | | |
|---|---|---|---|---|
| 2009/0305684 | A1* | 12/2009 | Jones | H04L 63/20 455/418 |
| 2010/0183020 | A1* | 7/2010 | Yin | H04L 12/14 370/401 |
| 2010/0272013 | A1* | 10/2010 | Horn et al. | 370/328 |
| 2010/0284336 | A1* | 11/2010 | Rui | H04L 12/14 370/328 |
| 2011/0058521 | A1* | 3/2011 | Xu et al. | 370/328 |
| 2011/0170517 | A1* | 7/2011 | Bakker et al. | 370/328 |
| 2011/0171953 | A1* | 7/2011 | Faccin et al. | 455/426.1 |
| 2011/0173332 | A1* | 7/2011 | Li | H04L 12/14 709/227 |
| 2011/0302289 | A1* | 12/2011 | Shaikh | H04L 29/12216 709/223 |
| 2012/0033679 | A1* | 2/2012 | Horn | 370/401 |
| 2012/0265888 | A1* | 10/2012 | Roeland et al. | 709/228 |
| 2012/0287844 | A1* | 11/2012 | Ophir et al. | 370/315 |
| 2013/0343274 | A1* | 12/2013 | Zhang | H04W 8/26 370/328 |
| 2014/0029546 | A1* | 1/2014 | Schrader et al. | 370/329 |

OTHER PUBLICATIONS

Alcatel-Lucent et al., "Comparison of 3GPP Femto Architecture Options," 3GPP Draft; TD S2-103567, 3GPP TSG SA WG2 Meeting #80, retrieved Aug. 24, 2010, XP050458597, pp. 1-16.

3GPP TR 23.839 V0.3.0 9 (Oct. 2010), Technical Specification, "3rd Generation Partnership Project; Technical Specification Group Services and System Aspects; Study on Support of BBF Access Interworking (Release 11)," Oct. 26, 2010, pp. 1-117, XP050461988.

ZTE: "Discussion on an Alternative Architecture for BBF Interworking via WLAN Access," 3GPP Draft; TD S2-103412, 3GPP TSG SA WG2 Meeting #80, retrieved Aug. 24, 2010, XP050458478, pp. 1-6.

Nokia Siemens Networks: "Femto Architecture 2, S9 and S9* Sessions," 3GPP Draft; TD S2-105752, 3GPP TSG SA WG2 Meeting #82, retrieved Nov. 9, 2010, XP050468126, pp. 1-4.

3GPP TR 23.839 V0.2.0 (Sep. 2010), Technical Specification, "3rd Generation Partnership Project; Technical Specification Group Services and System Aspects; Study on Support of BBF Access Interworking (Release 10)," Sep. 2010, 82 pp.

3GPP TS 33.320 V10.0.0 (Sep. 2010), Technical Specification, "3rd Generation Partnership Project; Technical Specification Group Services and System Aspects; Security of Home Node B (HNB)/ Home Evolved Node B (HeNB) (Release 10)," Sep. 2010, 33 pages.

* cited by examiner

METHOD, APPARATUS AND SYSTEM FOR DECIDING ON A CONTROL ENTITY FOR A PACKET DATA CONNECTION

TECHNICAL FIELD OF THE INVENTION

The present invention relates to a mechanism for controlling a communication connection. In particular, the present invention is related to a method, a system and apparatus for deciding on a control entity to be involved for controlling a packet data connection.

BACKGROUND OF THE INVENTION

Policy control architecture has been defined by 3rd Generation Partnership Project (3GPP). Policy elements can maintain information on active packet connections of users and about packet gateways via which the packet connections traverse.

In the future, 3GPP mobile networks can interface fixed broadband networks, defined for example by broadband forum (BBF). Policy and charging control is an important and integral part of the interworking. A UE connected to a fixed broadband access can use services that are offered by the 3GPP mobile network, i.e. the user traffic can be routed from the broadband access to the 3GPP packet core network. Both the fixed broadband network and the 3GPP network can have policy control and enforcement functions on the user plane.

Also, A UE connected to a 3GPP access can uses services that are offered by the fixed broadband network, i.e. the user traffic is routed from the 3GPP access to the fixed broadband packet core network. Again, both the 3GPP and fixed broadband network can have policy control and enforcement functions on the user plane.

In one architectural scenario a 3GPP Femto Home Node-B (H(e)NB) can be connected via a fixed broadband access to a 3GPP mobile core network. In this scenario an IP security tunnel is established between the home Node B and the security gateway (SeGW) in the mobile core network. Three different policy control/decision entities may be involved in a user session: Broadband policy control function (BPCF) in the broadband access, visited PCRF (V-PCRF) in the visited mobile network in a roaming case and home PCRF (H-PCRF) in the home mobile network.

Currently it is open how the different policy control entities (e.g. V-PCRF and H-PCRF) can find each other and how the related control sessions (S9, S9*, Gxc) can be established.

SUMMARY OF THE INVENTION

The present invention overcomes at least some of above drawbacks by providing an apparatus, a method and a computer program product comprising receiving a protocol identifier indicating a protocol used in a packet data connection of a user, determining if the user is roaming, and, deciding on a control entity to be involved for controlling the packet data connection, depending on the protocol identifier and result of the determination if the user is roaming.

According to one aspect of the invention, the receiving can comprise to receive an identity of an access network entity via which the user is connected, and/or, the determining if the user is roaming can comprise:

receiving a roaming indication, and/or,
determining if the user is roaming using the received identity of the access network entity of the packet data connection.

The access network entity can be a home node B (HNB).

According to one aspect of the invention, when the result of the determination is that the user is roaming, the deciding on the control entity can comprise:

selecting a first control entity located in a visited mobile network if the protocol identifier indicates that a first protocol is used, and/or,
selecting a second control entity external to the visited mobile network if the protocol identifier indicates that a second protocol is used, so as to bypass control functionality by the visited mobile network.

The first protocol can be mobile IP (PMIP) and the second protocol can be GPRS tunneling protocol (GTP).

According to one aspect of the invention, the second control entity can be located in or can control a network domain where the access network entity is located, and/or the network domain can comprise any of:

a broadband home network,
a fixed broadband network
3GPP femto access network
Broadband Forum (BBF) access network.

According to one aspect of the invention, the apparatus, method and computer program can comprise resolving a contact address of the second control entity based on the identity of the access network entity, and/or can comprise initiating a control session establishment with the selected control entity.

The control entity can be a policy and/or charging control function and/or the control session can be established for transmitting policy and/or charging instructions to the selected control entity.

According to one aspect of the invention, the receiving, determining and deciding can be performed during establishment of the packet data connection.

Further, an apparatus, a method and a computer program are provided comprising; transmitting a protocol identifier indicating a protocol used in a packet data connection of a user and transmitting an identity of an access network entity of the packet data connection.

According to one aspect of the invention, the apparatus, method and computer program can comprise determining if the user is roaming and transmitting, when the result of the determination is that the user is roaming, an indication indicating that the user is roaming, for example to a policy control entity.

According to one aspect of the invention, the protocol identifier can indicate if GPRS tunneling protocol (GTP) or proxy mobile IP (PMIP) is used.

Further, an apparatus, a method and a computer program are provided comprising, establishing a secure packet data connection for a user with an access network entity, and, transmitting an identity of the access network entity in a GPRS tunneling protocol (GTP) message. The access network entity can be home node B (HNB).

Further, an apparatus, a method and a computer program are provided for selecting a control entity for a packet data connection of a user, where the user is accessing a mobile network via a fixed network access, comprising:

determining, in a home network of a user, if the user is roaming,
determining a protocol used in a packet data connection, deciding on a control entity to be involved for the packet data connection depending on the protocol and the result of the determination if the user is roaming.

According to one aspect of the invention, the apparatus, method and computer program can comprise transmitting an identity of a fixed network access entity to the home network of the user and the determining if the user is roaming can be performed using the identity.

According to one aspect of the invention, the apparatus, method and computer program can comprise receiving, in the home network of the user, a roaming indication indicating that the user is roaming.

Embodiments of the present invention may have one or more of following advantages:
- Optimizing the architecture by by-passing a redundant visited PCRF and reducing the number of required protocol legs in the policy control chain.
- Mobile packet switched and fixed broadband infrastructure vendors who support interworking between mobile and fixed broadband networks can benefit from simpler policy control architecture in the more common GTP case, as no visited PCRF is required. Only one protocol leg is required (instead of two successive legs).
- Standardization and implementations can become simpler.

DETAILED DESCRIPTION OF THE INVENTION

Figure 1:
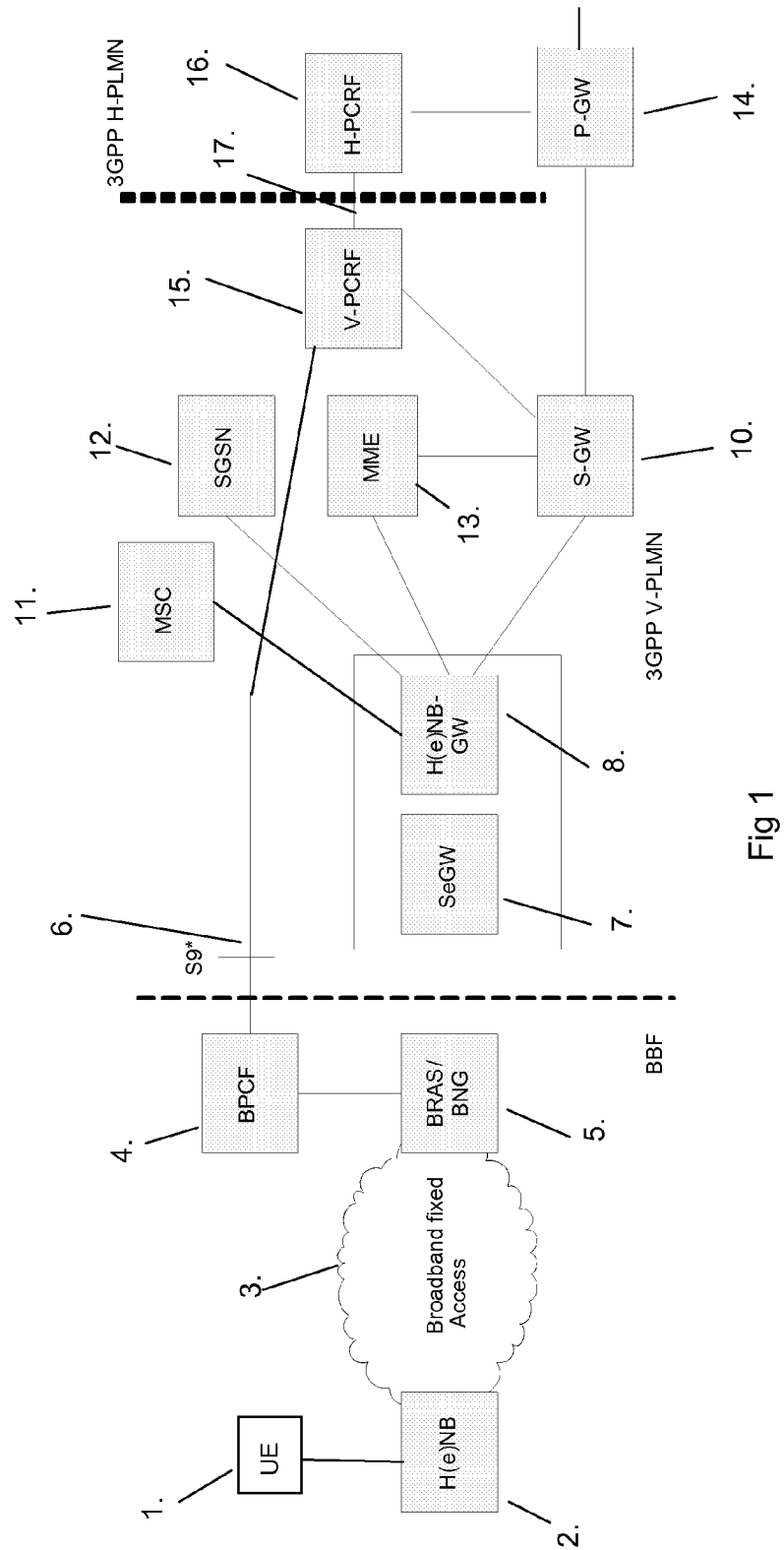
FIG. 1 illustrates architecture relevant for aspects of the invention.

IP-Connectivity Access Network (IP-CAN) refers to the collection of network entities and interfaces that provides the underlying IP transport connectivity between the UE and, for example, IP multimedia subsystem (IMS) entities. For example, a GPRS network can be used as an IP-connectivity access network.

IP flow is a unidirectional flow of IP packets with the same source IP address and port number and the same destination IP address and port number and the same transport protocol.

IP-CAN session is an association between a UE and an IP network. The association can be identified by one or more UE IPv4 addresses/and/or IPv6 prefix together with a UE identity information, if available, and a PDN represented by a PDN ID (e.g. an access point name (APN)). An IP-CAN session can incorporate one or more IP-CAN bearers. Support for multiple IP-CAN bearers per IP-CAN session is IP-CAN specific. An IP-CAN session exists as long as the related UE IPv4 address and/or IPv6 prefix are assigned and announced to the IP network.

Serving gateway (S-GW, SGW) is a gateway that can terminate the interface towards evolved UMTS terrestrial radio access network (UTRAN) for UE and as so is the contact point to the network. The UE that is associated with the evolved packet system (EPS) can have a single SGW at a given point of time.

Security gateway (seGW, Sec-GW), is a gateway that provides security based on Internet Protocol (IP) security and Internet Key exchange (IKE) and that can be located between different networks such as public and private networks or between network elements such as the evolved node B (eNB) and core network entities. The core network entities can be, for example, the mobility management entity (MME), serving gateway (SGW), and operation and management server (O&M). The control plane, user plane, management plane, and synchronisation plane between the eNB and core network entities can be protected by the security gateway that is located at the core edge. In addition, a security gateway can protect the control plane and user plane traffic that results from X2 inter-eNB communication. When a security gateway is located between public and private networks, it can prevent unauthorised intrusions into the private network and can provide tunneling capabilities and private data encryption. A security gateway for a virtual private network (VPN) can be a router, a firewall, integrated VPN hardware, or VPN software.

Serving GPRS support node (SGSN) is a GPRS support node in the IP-CAN that serves GPRS mobile stations by sending or receiving packets via a base station subsystem or a radio access network. SGSN is the basic element of the GPRS infrastructure. It stores for each mobile in its context different parameters used to route the packets, for example information about the mobile's location.

Gateway GPRS support node (GGSN) acts as a gateway between the GPRS network and packet-switched public data network (PSPDN). For the packet-switched public data network, the GPRS network resembles a subnetwork which can transfer data to or from a GPRS mobile station. The GGSN can hide the operation of the GPRS network from the packet-switched public data network through the encapsulation of packets. From the external network's point of view, the gateway GPRS support node is simply a router to a subnetwork.

GPRS Tunnelling Protocol (GTP) is a protocol that is used in the GPRS for transmitting user data packets and signalling between GPRS support nodes (GGSN, SGSN) over GPRS backbone network.

Proxy Mobile IP (PMIP) is a version of Mobile IP (MIP) that allows the movement of the mobility control from the mobile node to a proxy in the network.

Policy and charging rules function (PCRF) is a function that defines and provides the policy and charging rules that are used in the policy enforcement points for policy control and flow-based charging control. The PCRF has been developed for the 3GPP Release 7 and it combines the charging rules with the policy decision function of earlier 3GPP architecture releases. PCRF can maintain IP-CAN session associated with users.

S9 reference point is a reference point between the visited and home PCRF when the user is roaming. The S9 reference point is used to transfer the quality of service (Qos), policy and charging rules.

So called S9* reference point is used between 3GPP and fixed broadband domains, between the mobile network PCRF and the BPCF in scenarios where both 3GPP and fixed broadband access networks belong to the same operator or to different operators. The function of the S9* interface is to convey sufficient information to the BPCF to enable it to identify a broadband network gateway (BNG) that, for example, a H(e)NB connects to, and perform admission control based on the bandwidth requirements and QoS attributes of the bearers or aggregate of bearers with similar QoS characteristics being established.

Policy and charging enforcement function (PCEF) is a function that receives the policy and charging rules from the PCRF, detects traffic, and enforces the rules for classifying the traffic on service data flows. The control for the quality of service (QoS) is applied per service data flow in the PCEF. The PCEF can be co-located in a packet data network (PDN) gateway.

Gx reference point is the reference point between a packet data network (PDN) gateway and a PCRF. The Gx reference point can be used to transfer the policy and charging information from the PCRF to the PCEF located in the PDN gateway.

Policy and Charging Control (PCC) rules can be used to:
detect that a packet belongs to a service data flow.
downlink IP CAN bearers can be selected based on service data flow filters within the PCC rule
Service data flow filters can be used for the enforcement that uplink IP flows are transported in the correct IP CAN bearer.
identify a service to which the service data flow contributes to.
provide charging parameters for a service data flow.
provide quality of service (QoS) and policy control for a service data flow.

The PCEF can select a PCC rule for each received packet by evaluating received packets against service data flow filters of PCC rules in the order of the precedence of the PCC rules. When a packet matches a service data flow filter, the packet matching process for that packet can be completed, and the PCC rule for that filter shall be applied.

As part of PCC procedures, an IP-CAN session associated with an user can be established. The PCRF can select a bearer control mode that will apply for the IP-CAN session and provide it to the PCEF via the Gx reference point.

The PCRF can indicate PCC rules to be applied at the PCEF in two ways over the Gx reference point:

1.) In pull procedure a PCC rule is requested by the PCEF. In response to a request for PCC rules being made by the PCEF, the PCRF can provision PCC rules, for example in a CC-Answer diameter message.

2.) In push procedure the PCRF can decide to provision PCC rules without obtaining a request from the PCEF, for example, responsive to information provided to the PCRF from an application function (AF) over Rx reference point, or based on an internal trigger within the PCRF. When provisioning PCC rules without a request from the PCEF, the PCRF can include the PCC rules in an RA-Request Diameter message.

Attribute-value pair (AVP) is a generic pair of values that consists of an attribute header and the corresponding value. The AVP can be used to encapsulate protocol-specific data such as routing information, as well as authentication, authorisation, or accounting information. Diameter protocol can carry information using AVPs. Gx reference point can transfer information using AVPs.

Digital subscriber line (xDSL, DSL) is a family of digital telecommunications technologies designed to allow high-speed data communication over the existing copper telephone lines between end-users and telephone companies. xDSL is a generic abbreviation for various different DSL types, for example ADSL, HDSL, RDSL, SDSL, and VDSL. xDSL calls for modems at either end of a copper twisted-pair wire to deliver data, voice, and video over a dedicated digital network.

Broadband remote access server (BRAS) is an access server that routes traffic to and from the digital subscriber line (DSL) access multiplexers (DSLAM) on an internet service provider's network. The BRAS can be located at the core of the internet service provider's network and can aggregate user sessions from the access network, and terminate remote users at the corporate network or internet users at the internet service provider network. The BRAS can provide firewall, authentication, and routing services. The BRAS is a broadband network gateway that can be an aggregation point for the user traffic. The BRAS can provide aggregation capabilities (e.g. IP, PPP, and Ethernet) between the access network and the network service provider (NSP) or access service provider (ASP). Beyond aggregation, the BRAS can also be an injection point for policy management and IP QoS in the access network.

Broadband Network Gateway (BNG) is an IP edge router where bandwidth and QoS policies may be applied.

Policy enforcement point (PEP) defined by the BBF can correspond to PCEF of mobile networks. PEP functions can be implemented in a BNG and/or DSLAM. The reference point between a BPCF and a BNG is called R reference point. The BNG and DSLAM may have a layer 2 control protocol to communicate with each other, e.g. send policy control parameters to each other, which means that in some cases part of the PEP functionality may be in DSLAM.

Femto access point (FAP) is an access point that provides transmission and control functions that are necessary for radio coverage of one femtocell. A femto access point is a 3G radio access interface placed on the subscriber's premises, usually provided as part of the customer premises equipment. The range of the femto access point defines a single femtocell, or the subscriber's home femtozone and its function is to translate IP-based traffic into UMTS signals.

Femto gateway (FGW) is a gateway through which specified femto access points can get access to the mobile operator's core network. The femto gateway can communicate via the internet protocol with the femto access points for which it is responsible. Femto can use fixed broadband access, for example DSL, to access the mobile core network.

FIG. 1 illustrates architecture relevant for aspects of the invention. A UE 1 which is roaming in a micro network (e.g. a private home network) is connected to a local base station 2, for example to a femto access point or a HNB. The UE 1 can access the mobile core network via broadband fixed access 3, for example over an xDSL connection. The broadband network 3 can be connected via a BRAS 5 to a security GW 7 of a mobile network. The mobile network can have a HNB GW 8 which can be integrated to the Sec-GW 7. The broadband network 3 can have its own policy entity 4 which can interface a policy entity 15 of the mobile network over S9* interface 6.

The mobile network has a mobile switching center (MSC) 11, which provides for example call control functionality, a SGSN 12 which provides packet data switching and services and a mobility management entity (MME) 13.

A packet data connection from the fixed broadband network 3 can traverse via a serving GW 10 and a packet data gateway 14 to a packet core or internet. The protocol used for a packet data connection between the SGW 10 and the PGW 14 can be, for example, GTP or PMIP. When the UE 1 is roaming, the visited network can have a policy entity 15 which can connect a policy entity 16 in the home network of the UE 1 over S9 interface 17 and a policy entity 4 in the fixed broadband network over S9* interface. The serving gateway 10 can be co-located with the sec-GW7.

Currently it is assumed to always use a visited network's PCRF 15 between the BPCF 4 and home PCRF 16 in the roaming, home routed case. However, in the most common SGW/PGW protocol case, i.e. when GTP protocol is used between the SGW 10 and PGW 14, the visited PCRF 15 is not required for any original control purposes. Using the visited PCRF 15 could help to solve the inter-realm entity finding/discovery problems, and thus the visited PCRF 15 could be used as a message intermediator between the BPCF 4 and home PCRF 16 even in the GTP case. This splits the control connection into two separate and successive protocol legs, S9 and S9* and can unnecessarily load the visited PCRF 15.

According to an aspect of the invention, a home PCRF 16 can directly contact a BPCF 4, when the user is roaming and the GTP is used between the SGW 10 and the PGW 14.

Figure 3:
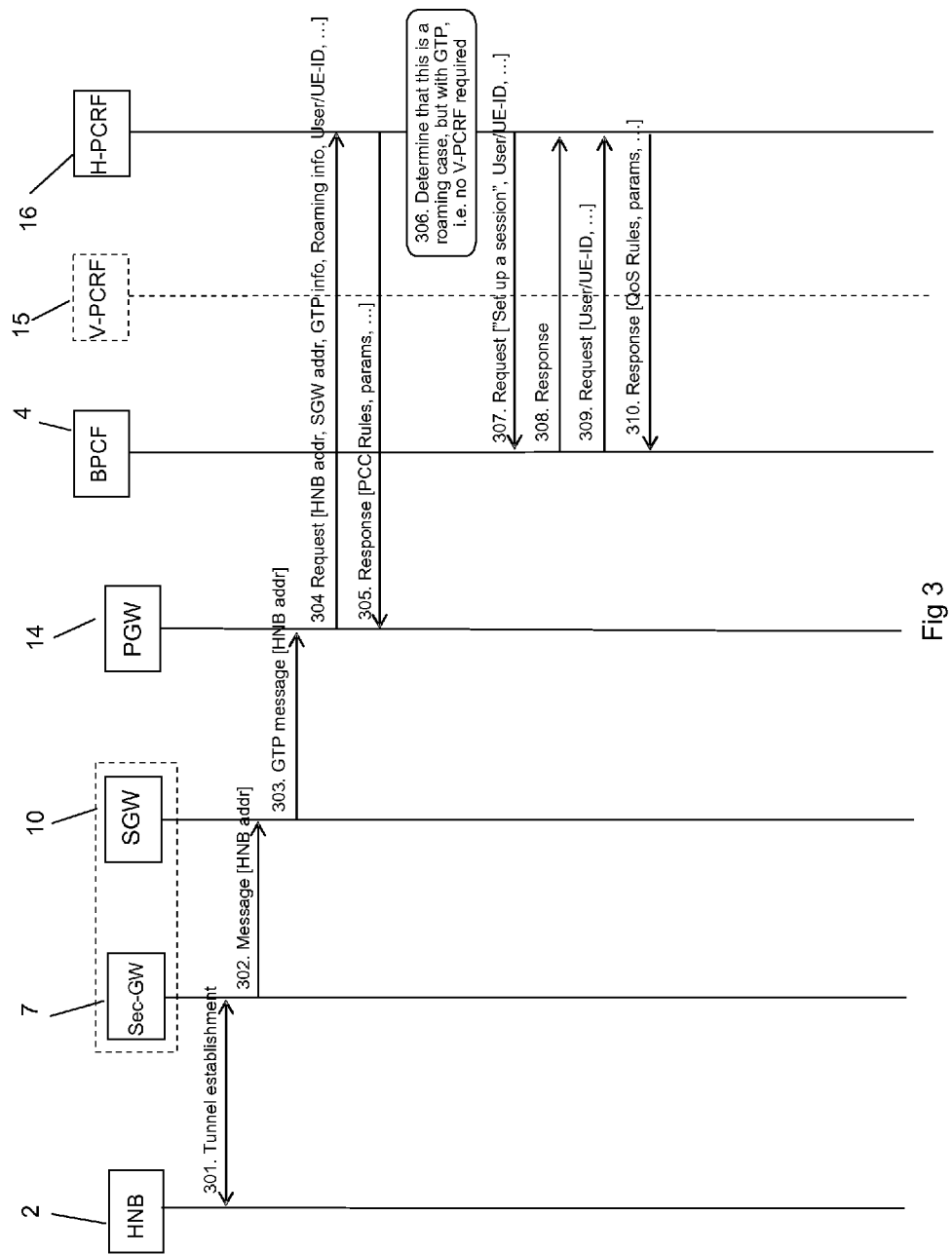
Figure 4:
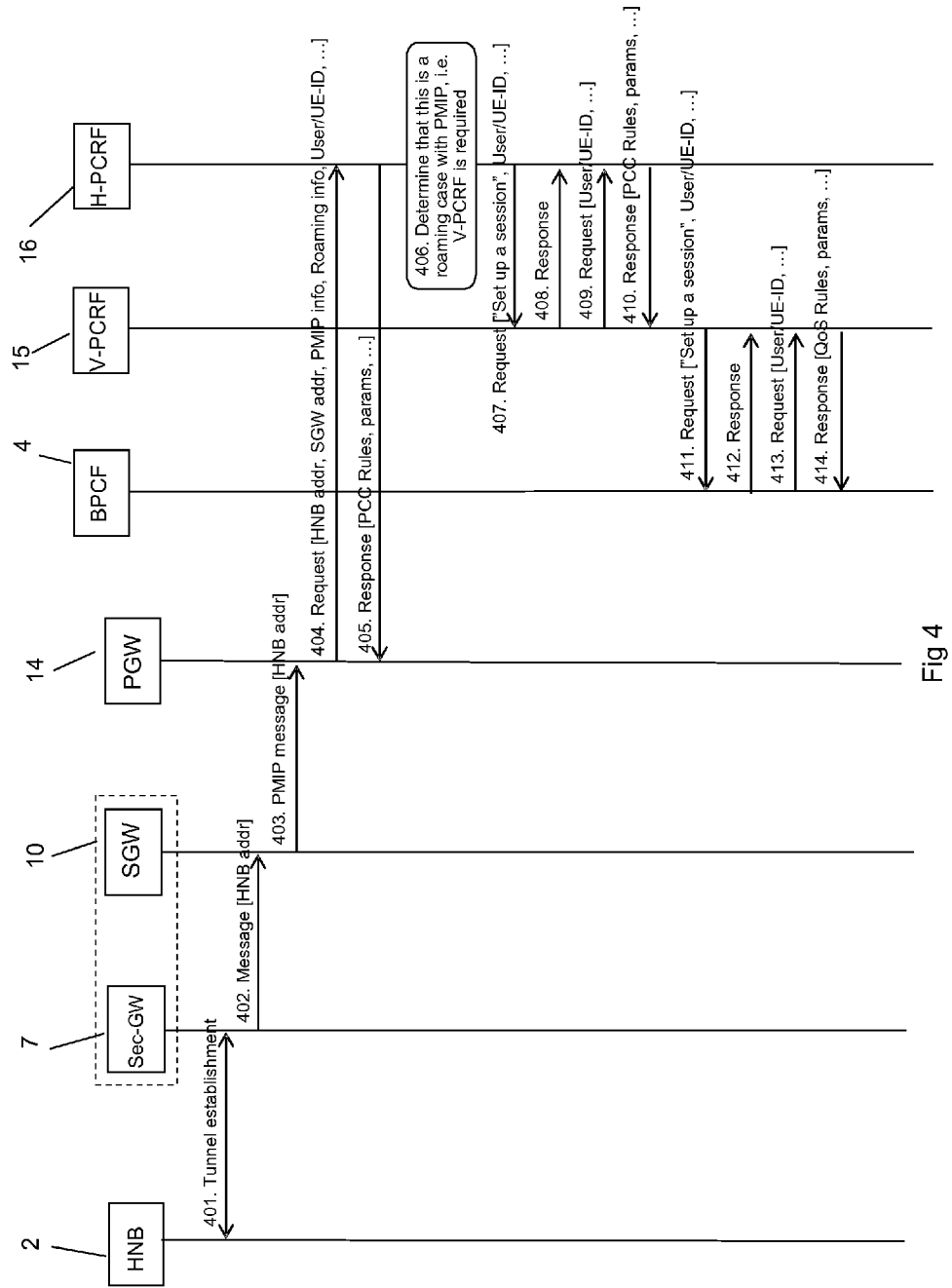

Some aspects of the invention are explained in the following with help of FIGS. 2-4. When UE 1 attaches the network and the IP security tunnel is established 201 between the HNB (3GP Femto) 2 and SecGW 7, the SecGW 7 can transmit 202 the HNB 2 address, i.e. the IP address of the HNB 2 end of the tunnel, to the serving gateway SGW 10. The SGW 10 can transmit 203 the HNB 2 address, i.e. the IP address of the HNB 2 end of the tunnel, to the PGW 14, for example, within the GTP protocol message exchange.

The PGW 14 can transmit 204 the HNB 2 address, the SGW 10 address, GTP/PMIP protocol information (i.e. whether the GTP protocol or the PMIP protocol is used between the SGW 10 and PGW 14), optionally roaming information (i.e. whether the user is roaming) and other regular parameters like the user/UE ID to the home PCRF 16.

According to an aspect of the invention, the home PCRF 16 can determine 206, for example, from roaming info (if available) or from the HNB 2 or SGW 10 address realm, whether the UE 1 is roaming or not.

Figure 2:
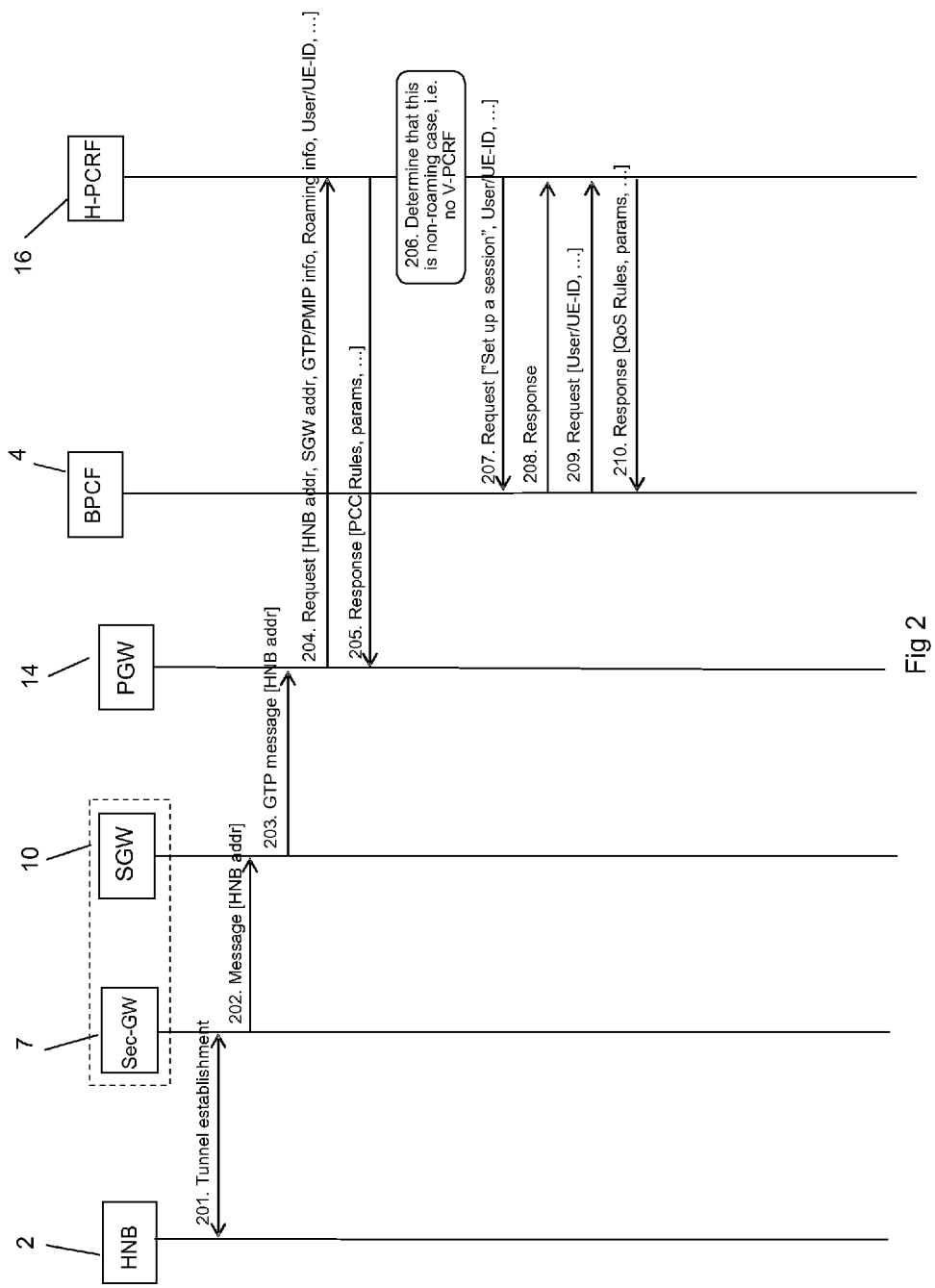
FIGS. 2-4 illustrate message flows according to aspects of the invention.

According to an aspect of the invention, in a non-roaming case presented in FIG. 2, the home PCRF 16 can deduce/determine the BPCF 4 contact address from the HNB 2 address or address realm (e.g. by local configuration or through a query to an entity that maintains such address/contact links). After determining the BPCF 4 address, the home PCRF 16 can either request the BPCF 4 to establish an S9* control session towards the home PCRF 16 (as with steps 207 and 208 in FIG. 2), or the home PCRF 16 can itself initiate an S9* control session towards the BPCF 4. The message exchange 209, 210 can transfer QoS rules and possibly other parameters from the home PCRF 16 to the BPCF 4.

According to an aspect of the invention, in a roaming case the home PCRF 16 can deduce/determine in 306 from the GTP/PMIP protocol information received in request 304 whether a visited PCRF 15 is required or not. If the protocol between the SGW 10 and PGW 14 is GTP (FIG. 3), a visited PCRF 15 is not required. The home PCRF 16 can deduce/determine the BPCF 4 contact address from the HNB 2 address or address realm (e.g. by local configuration or through a query to an entity that maintains such address/contact links). After determining the BPCF 4 address, the home PCRF 16 can either request the BPCF 4 to establish an S9* control session towards the home PCRF 16 (as with steps 307 and 308 in FIG. 3), or the home PCRF 16 can itself initiate an S9* control session towards the BPCF 4. The message exchange 309, 310 may transfer QoS rules and possibly other parameters from the home PCRF 16 to the BPCF 4.

According to an aspect of the invention, if the protocol between the SGW 10 and PGW 14 is PMIP (FIG. 4), a visited PCRF 15 can be required, for example, due to protocol interworking. For example, some control plane parameters exchanged between access network elements (e.g. MME) and PGW shall be transferred via the visited PCRF and home PCRF, because the PMIP is not able to support the required functionalities. The home PCRF 16 can deduce/determine 406 the visited PCRF 15 contact address from the SGW 14 address or address realm (e.g. by local configuration or through a query to an entity that maintains such address/contact links) received in request 404. After determining the visited PCRF 15 address, the home PCRF 16 can either request the visited PCRF 15 to establish an S9 control session towards the home PCRF 16 (as with steps 407 and 408 in FIG. 4), or the home PCRF 16 may itself initiate an S9 control session towards the visited PCRF 15. Among other parameters the home PCRF 16 can transmit the HNB 2 address to the visited PCRF 15. The message exchange 409, 410 can transfer also PCC rules and possibly other parameters from the home PCRF 16 to the visited PCRF 16. The visited PCRF 15 can use the HNB 2 address or address realm to deduce/determine the BPCF 4 contact address (e.g. by local configuration or through a query to an entity that maintains such address/contact links). Now the visited PCRF 15 may either request the BPCF 4 to establish an S9* control session towards the visited PCRF 15 (as with steps 411 and 412 in FIG. 4), or the visited PCRF 15 may itself initiate an S9* control session towards the BPCF 4. The message exchange 413, 414 can transfer QoS rules and possibly other parameters from the visited PCRF 15 to the BPCF 4.

New signaling information can be transmitted, for example, using existing or new signaling parameters. For example, an identity of an access network node (HNB) can be transmitted in a new GTP parameter. New signaling information to and from a policy entity, for example roaming indication and/or access node identities, can be transmitted in a new Diameter AVPs.

Figure 5:
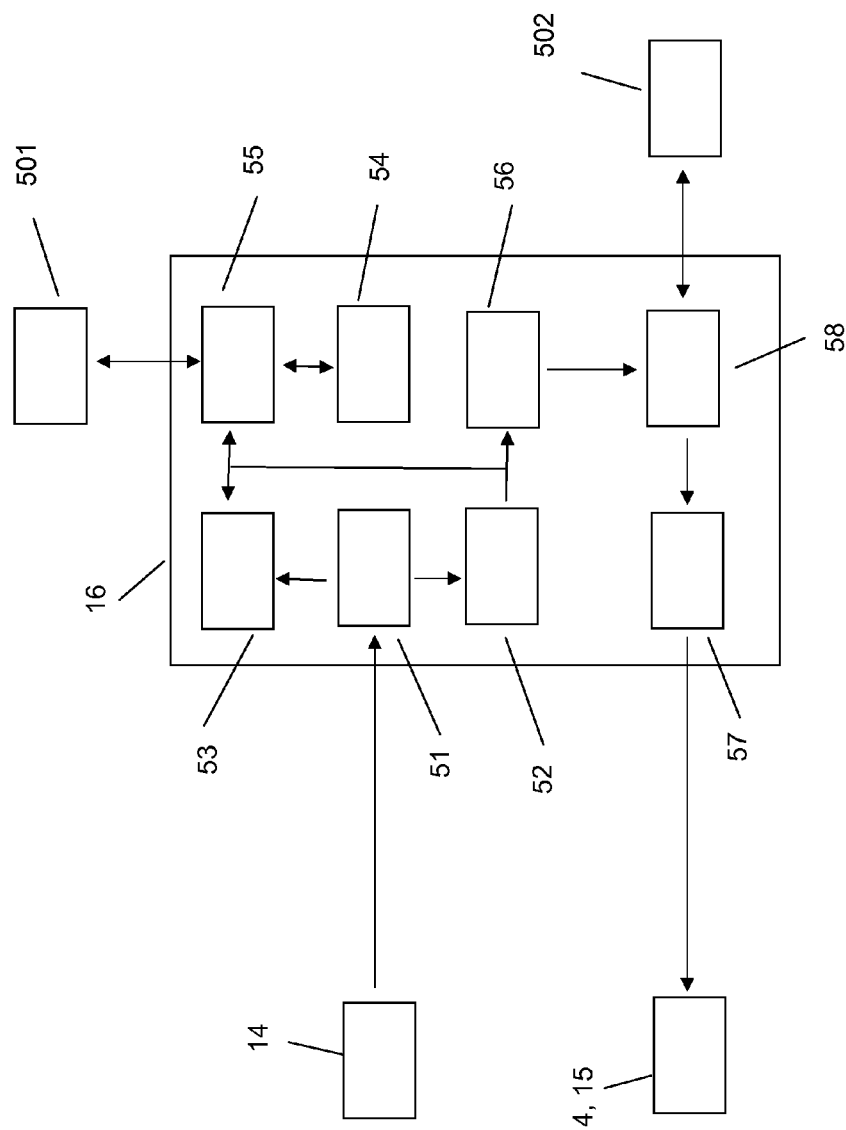
FIG. 5 illustrates an example structure and functions of an apparatus implementing aspects of the invention.

FIG. 5 illustrates an example internal structure and functions of apparatuses implementing aspects of the invention. An apparatus 16 can have a receiving unit 51 configured to receive a request from a network entity, for example, from a PGW 14. The receiving unit 51 can receive signaling messages, for example, according to Diameter protocol and can receive among other signaling information, for example, an identity of an access network node (e.g. HNB), SGW address, user/UE related identities, roaming information relating to a user and a protocol identifier indicating a protocol used between packet data nodes. The apparatus 16 can have a protocol determination unit 52 configured to determine if GTP or PMIP or some other protocol is used between the packet data nodes, based on the identifier received by the receiving unit 51. The apparatus can have a roaming unit 53 configured to determine if the user 1 to which the request is associated is roaming. In the determination the roaming unit 53 can use roaming information if such is received by the receiving unit 51, or, can contact a resolving unit 55 which can be configured to resolve information based on identities, for example, by using realm or domain part of addresses. The resolving unit 55 can communicate with a storage unit 54 which can be configured to maintain information and addresses relating to various network elements, network domains and about the logical network structure, for example, to find out relevant control entity contact addresses if the user is roaming. Alternatively the resolving unit 55 can obtain information relating to various network elements, network domains and about the logical network structure from an external server 501 configured to hold and deliver such information to other network elements. A deciding unit 56 can be configured to decide and/or select which control entity 4, 15 should be involved to control a packet data connection of the UE 1. The deciding unit 56 can use result of a roaming determination from the roaming unit 53 and/or the result of the determination of the protocol determination unit 52, when making the decision.

The apparatus can have an instruction unit 58 configured to store instructions for controlling traffic and/or session of a user. The instructions can contain charging and/or policy control rules. Alternatively or in addition, the instruction unit 58 can be configured to retrieve instructions from an external storage 502. A transmitting unit 57 can be configured to transmit a signaling message to a control entity 4, 15 selected by the deciding unit 56, for example, to initiate transmitting the instructions from the instructions unit 58 to the selected control entity 4, 15.

A packet data GW 14 can have a transmitting unit configured to transmit a protocol identifier indicating a protocol used (e.g. GTP or PMIP) in a packet data connection of a user and/or configured to transmit an identity of an access network entity of the packet data connection.

All units described above in relation to FIG. 5 may be implemented for example using microprocessors, chips and/or other electrical components and/or by software.

A packet gateway entities and a policy entity may be physically implemented in a switch, router, server or other hardware platform or electronic equipment which can support data transmission and processing tasks, or can be implemented as a component of other existing device.

Figure 6:
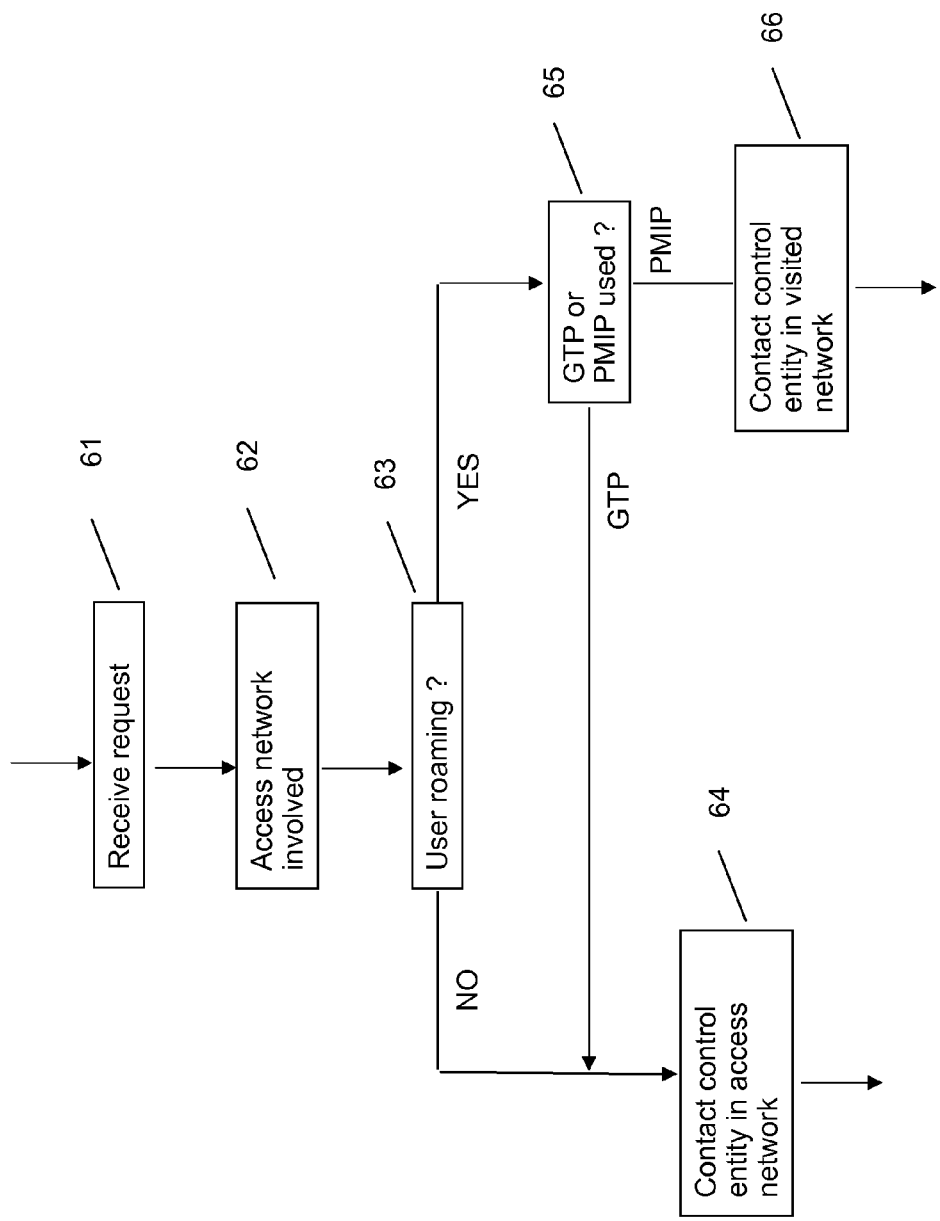
FIG. 6 illustrates an example decision logic implementing aspects of the invention.

FIG. 6 illustrates an example decision logic which can be implemented by an apparatus of software component implementing aspects of the invention. In 61 a request can be received, for example from a PGW 14. The request can relate to a user 1 and can contain information relating to network elements and the user. The request can contain, for example, an address of an access network node (e.g. HNB 2), addresses of one or more packet data nodes (SGW 10, PGW 14), a protocol identifier indicating a protocol (GTP, PMIP) used between the packet data nodes and/or an indication indicating if the user is roaming. In 62 it is determined that the user 1 is accessing the mobile network through certain access network 3, which can have its own control entity 4. The determination can be made based on the address or an address realm of the access network node (e.g. HNB 2), for example, by local configuration or by querying an external database. In 63, a determination is made if the user 1 is roaming in a visited mobile network. If the user 1 is not roaming, in 64 a decision can be made to contact a control entity 4 of the access network 3. An address of the control entity 4 can be resolved based on the address or an address realm of the access network node (e.g. HNB 2), for example, by local configuration or by querying en external database. If the user is roaming, a determination of a protocol used between the packet data nodes can be made in 65, based on the received protocol identifier. If the used protocol is GTP, a decision can be made to contact a control entity 4 of the access network 3. If the used protocol is PMIP, in 66 a decision can be made to contact a control entity 15 of the visited mobile network.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention claimed is:

1. A policy and charging rules apparatus, comprising:
a receiver configured to receive a protocol identifier indicating a protocol used in a packet data connection of a user,
a processor for determining a policy control entity, being an entity other than a policy and charging rules apparatus, to be involved for controlling the packet data connection, wherein in the event that the user is not roaming, the processor is configured to determine a contact address of the policy control entity from address information related to an access network entity via which the user is able to establish connection, and
a transmitter configured to transmit a request to the policy control entity requesting the policy control entity to establish a control session towards the policy and charging rules apparatus.

2. An apparatus of claim 1, wherein determining if the user is roaming comprises at least one of:
receiving a roaming indication, and,
determining if the user is roaming using the received identity of the access network entity of the packet data connection.

3. An apparatus of claim 1, wherein the access network entity comprises a home node B.

4. An apparatus of claim 1, wherein the control entity comprises a policy and/or charging control function and wherein the control session is for transmitting policy and/or charging instructions to the selected control entity.

5. An apparatus of claim 1, wherein receiving a protocol identifier and, determining the control entity are performed during establishment of the packet data connection.

6. An apparatus of claim 1, wherein the protocol comprises at least one of mobile IP and GPRS tunneling protocol.

7. A policy control device, comprising:
a transmitter configured to transmit a protocol identifier, indicating a protocol used in a packet data connection of a user and an identity of an access network entity of the packet data connection, to a policy and charging rules apparatus to enable the policy and charging rules apparatus to determine a policy control entity, being an entity other than a policy and charging rules apparatus, to be involved for controlling the packet data connection, wherein in the event that the user is not roaming, the transmitter is configured to transmit the protocol identifier, indicating the protocol used in the packet data connection of the user and the identity of the access network entity of the packet data connection to the policy and charging rules apparatus to enable the policy and charging rules apparatus to determine a contact address of the policy control entity from address information related to an access network entity via which the user is able to establish a connection, so that the policy and charging rules apparatus is able to transmit a request to the policy control entity requesting the policy control entity to establish a control session towards the policy apparatus.

8. An apparatus of claim 7, wherein the transmitter is configured to transmit to a policy control entity.

9. An apparatus of claim 7, wherein the transmitter is configured to transmit the protocol identifier indicating if GPRS tunneling protocol or proxy mobile IP is used.

10. An apparatus of claim 7, wherein the access network entity comprises a home node B.

11. A method for selecting a policy control entity for a packet data connection of a user, wherein the user is accessing a mobile network via a fixed network access, comprising:
receiving at a policy and charging rules apparatus a protocol identifier to be used in a packet data connection,
determining at the policy and charging rules apparatus a policy control entity being an entity other than a policy and charging rules apparatus, to be involved for the packet data connection, wherein in the event that the user is not roaming, determining a contact address of the policy control entity from address information related to an access network entity via which the user is able to establish a connection, and
transmitting from the policy and charging rules apparatus a request to the policy control entity requesting the policy control entity to establish a control session.

12. A method of claim 11, further comprising receiving, in a home network of the user, a roaming indication indicating that the user is roaming.

13. A method of claim 11, wherein the first protocol comprises at least one of mobile IP and GPRS tunneling protocol.

14. A method, comprising:
transmitting from a policy control device a protocol identifier indicating a protocol used in a packet data connection of a user and an identity of an access network entity of the packet data connection to a policy and charging rules apparatus to enable the policy and charging rules apparatus to determine a policy control entity, being an entity other than a policy and charging rules apparatus, to be involved for controlling the packet data connection, wherein the event that the user is not roaming, the policy control device transmits the protocol used in a packet data connection of the user and the identity of the access network entity of the packet data connection to the policy and charging rules apparatus to enable the policy and charging rules apparatus to determine a contact address of the policy control entity from address information related to an access network entity via which the user is able to establish a connection, so that the policy and charging rules apparatus is able to transmit a request to the policy control entity requesting the policy control entity to establish a control session towards the policy and charging rules apparatus.

15. A computer program product embodied on a non-transitory computer readable medium, the computer program product comprising code means configured to, when loaded into a memory of a computer, control the computer to perform the method of claim 11.

* * * * *